May 2, 1933.  W. A. RARIG  1,907,288
MOTOR VEHICLE ATTACHMENT
Filed July 31, 1931
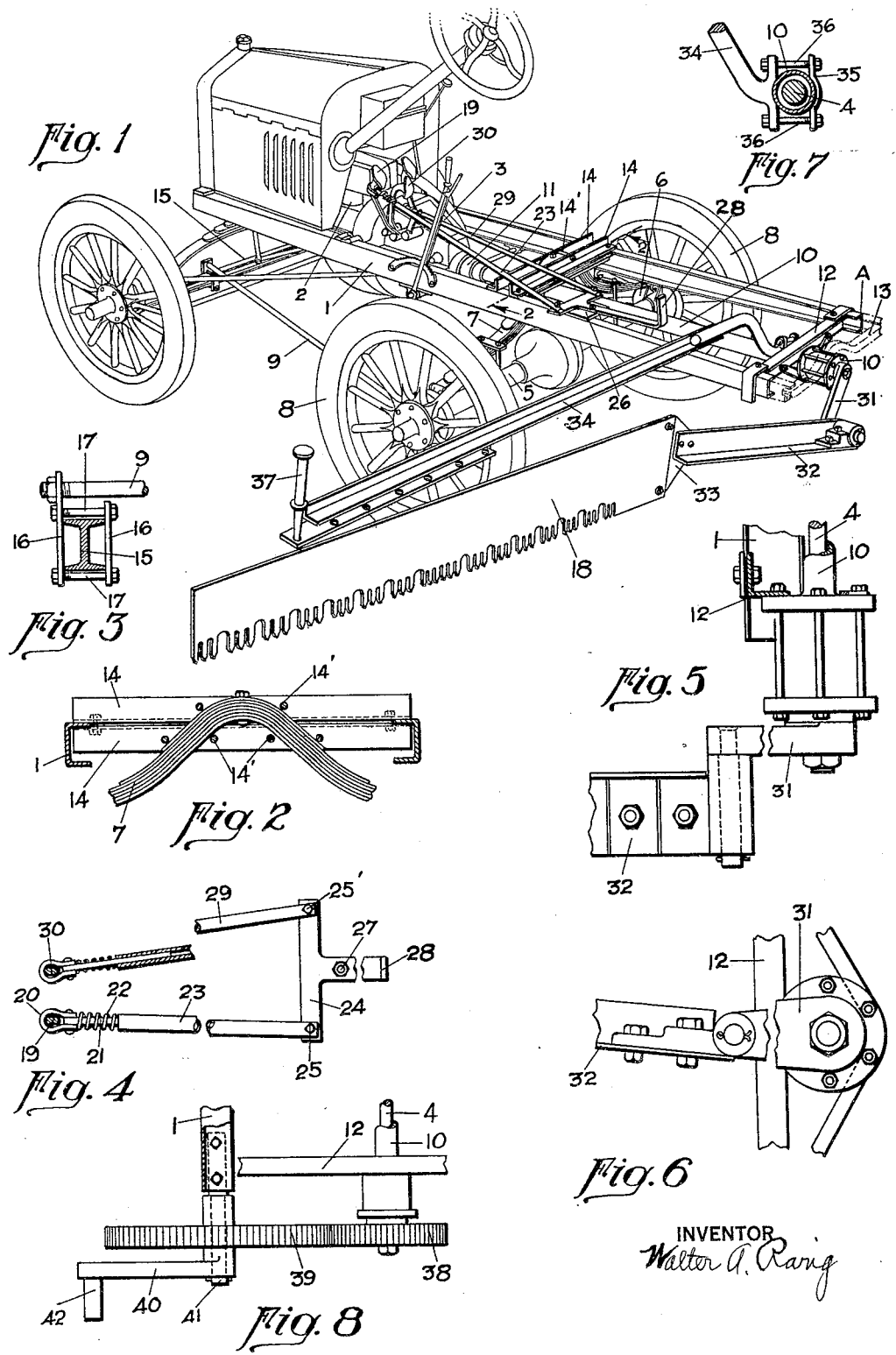
INVENTOR
Walter A. Rarig Patented May 2, 1933

1,907,288

UNITED STATES PATENT OFFICE

WALTER A. RARIG, OF OAKLAND, CALIFORNIA

MOTOR VEHICLE ATTACHMENT

Application filed July 31, 1931. Serial No. 554,274.

My invention relates to improvements in motor vehicle attachments wherein the power plant and transmission gearing of the vehicle is utilized in a novel manner for operating a drag saw therefrom for the purpose of cutting up timber and cutting down standing trees.

The main object of the invention is to provide an attachment adapted to be mounted on an ordinary passenger motor vehicle or motor truck, whereby a drag saw may be operated by a main drive shaft directly connected to the power plant transmission gearing of the vehicle for the purpose of sawing up logs resting on the ground longitudinally in respect to the vehicle, thereby presenting the additional advantage of easily towing or moving the sawing machine from cut to cut and from one location to another.

Another object of the invention is to provide means for conveniently operating the transmission gearing of a motor vehicle in conjunction with the employment of a drag saw operated directly by the power plant of the vehicle.

A further object of the invention is to provide an auxiliary reducing gearing adapted to be mounted on the chassis of a motor vehicle, and driven by a main drive shaft directly connected to the power plant transmission gearing of the vehicle for the operation of a reciprocating saw.

Drag saw machines that are now provided for cutting up logs are usually constructed in complete units, requiring specially constructed power plants, gearing, and supporting frames, and are comparatively cumbersome to handle and expensive, whereas in the present invention these disadvantages are overcome, as motor vehicles, particularly those that have been discarded for pleasure purposes providing these parts, may be utilized for conversion into easily transported and efficient drag saw machines. By this means the life of the car may be extended and a considerable economy effected by its continued use after its utility as a passenger vehicle has terminated.

With these and other objects in view, which will appear in the course of the subjoined description, the invention consists of the features of construction, combination and arrangement of parts, hereinafter described and claimed, reference being had to the accompanying drawing, in which:

Fig. 1 is a perspective view of a motor vehicle chassis showing the adaptability and arrangement of the drag saw as applied thereto.

Fig. 2 is a cross sectional view taken on line 2—2 of Fig. 1 with parts broken away, showing the method of connecting the spring of the rear axle assembly of the motor vehicle chassis when moved to its forward position.

Fig. 3 is a sectional end view of the front axle of the motor vehicle chassis, showing the means for connecting the brace rods thereto.

Fig. 4 is a broken top plan view of the speed changing control mechanism.

Fig. 5 is a side view with parts broken away, showing the crank arm connected to the drive shaft.

Fig. 6 is an end view of the same.

Fig. 7 is a sectional end view with parts broken away, of the anchoring bar connected to the drive shaft housing.

Fig. 8 is a sectional top view of the auxiliary speed reducing gearing.

In further reference to the drawing in which similar characters of reference indicate corresponding parts throughout the several views, the numeral 1 denotes the frame of an ordinary motor vehicle chassis, carrying the usual power plant 2 which includes the speed changing gear transmission contained within the casing 3, to which is connected the drive shaft 4 for normal engagement with the rear axle 5. The numeral 6 indicates the rear axle assembly which includes the vehicle spring 7, the rear wheels 8, and the braces 9. In the preferred arrangement of the vehicle parts for carrying out my invention, the pinion end of the drive shaft housing 10, in which is journaled the drive shaft 4, is disconnected from the rear axle assembly and is swung upward about the universal joint 11, and supported by the angle bar 12, secured to the frame 1. The frame 1 is severed transversely at the rear thereof at a point indicated by the letter A, and the spring 7 is disconnected from the transverse member 13 of the vehicle, shown in broken lines in Fig. 1 in normal position connected to the rear severed portion of the frame 1. The rear axle assembly is then moved forward to the position shown in full lines and the spring 7 is clamped to the angle bars 14 as by bolts and nuts 14′, and the ends of the angle bars 14 are suitably clamped to the vehicle frame 1. The braces 9 of the rear axle assembly, only one of which is shown on the drawing, are secured at their extremities to the front axle 15 by means of clamps 16 and bolts and nuts 17, thereby rigidly securing the rear axle assembly in its forward position to the vehicle frame for the purpose of employing the pinion end of the vehicle drive shaft for the operation of the reciprocating saw blade 18, hereinafter referred to, and for providing suitable clearance between the rear wheels of the vehicle and the saw blade. It is to be understood that should it be preferred to substitute a longer drive shaft than the one normally supplied with the vehicle, it will be unnecessary to alter the position of the rear axle assembly due to the fact that by employing a longer drive shaft an extension to the vehicle frame may be provided for supporting a bearing in which said drive shaft may rotate, thereby affording suitable clearance for the operation of the saw blade. However, it is deemed preferable to shorten the vehicle wheel base as previously described because of the advantage obtained in maneuvering the saw rig in comparatively limited space for timber sawing purposes.

In order to conveniently manipulate the usual transmission gearing pedals of the vehicle for the operation of the saw, there is clamped to the low-speed pedal lever 19 a member 20 which carries a rod 21 pivotally connected thereto and has a compression spring 22 mounted thereon adapted to be compressed by one end of the pipe 23 bearing against the member 20. This spring is provided for the purpose of exerting a uniform pressure against the pedal lever as the moving or engaging parts become worn, as when a planetary band-gripping type transmission is used, which is the case in the present instance. The pipe 23 is slidably mounted on the free end of the rod 21, and its other end is pivotally connected to one arm of the T-bar 24 by means of the bolt 25, which T-bar is pivotally connected to a bar 26 by means of a bolt 27, and the latter bar is firmly attached to the frame 1. This T-bar is provided with a handle 28, formed integral therewith, which is adapted to be turned by the operator in either of two horizontal directions from its neutral position for operatively engaging the low-speed and the reverse-speed gearing, respectively. When this handle is turned in one direction from its neutral position the low-speed gearing operatively engages, by means of the previously described connections with the drive shaft 4 for the rotation thereof, and when the handle is advanced to a point slightly more than 90 degrees from its neutral position, the pipe 23 contacts against the reverse-speed actuating pipe 29, therewith arresting and locking the motion of said T-bar. This locking action being accomplished by disposing the pivot bolt 27 somewhat rearwardly with respect to the bolts 25 and 25′ in said T-bar, thereby imparting an eccentric motion thereto. With slight effort the operator may unlock the T-bar by turning the handle of the same toward its initial position, thereby also operatively disengaging the low-speed gearing from the drive shaft 4. When it may be desired to employ the reverse-speed gearing of the vehicle, the handle 28 is turned in the opposite direction from its neutral position, therewith actuating the reverse-speed pedal lever 30 by means of similar pedal lever members, previously described, connected to the pivot bolt 25′ and the lever 30.

In my experiments I have found that an important advantage is obtained by employment of the reverse motion while sawing, inasmuch as the saw blade may be smoothly started when commencing the cutting operation by either using the low or reverse speed gearing according to the position of the crank arm that reciprocates the saw, and furthermore, should the saw become inadvertently stalled while cutting through the timber the use of the opposed speed allows the motion of the saw to be reversed and the cut again smoothly started without resorting to the usual practice of raising the saw from the work, it being apparent that either the low or reverse speed may conveniently be employed at the will of the operator. Also, it may here be noted that the saw blade is adapted for use on either side of the vehicle for cutting timber resting longitudinally with respect to the vehicle, by transferring the saw blade and its pitman from one side thereof to the other and employing the preferred gearing.

Referring further to the means provided for operating the saw from the drive shaft, a crank arm 31, which may, if desired, be made in the form of a fly wheel, is fastened to the pinion end of the drive shaft 4 and is connected with the pitman 32. This pitman on its opposite end is connected to a plate 33, to which is secured the saw blade 18 and thus the rotation of the crank arm is transformed to a reciprocating motion of the saw blade 18. It is to be noted that with the employment of this device any other suitable pitman may be connected to the crank arm for also conveniently operating various machines requiring a reciprocating motion, such as pumping machinery, and by use of the well known means for universally journaling and connecting the pitman on the crank arm to a horizontal swinging bar pivotally attached to the saw machine at one end, and to which the saw blade is connected at its other end in a horizontal plane, standing trees may be felled therewith.

An anchor bar 34, preferably made in welded sections, is pivotally mounted at one end on the drive shaft housing 10 by means of a clamp 35, and bolts and nuts 36. The opposite end of said anchor bar is provided with a series of holes, and through one of which is driven a spike 37 into the upper side of a log (not shown on the drawing) to provide a means for rigidly holding the log to the vehicle during the sawing operation. This anchor bar may be connected to the vehicle frame, if preferred.

Fig. 8 on the drawing shows an auxiliary speed reducing gearing adapted to be employed when comparatively large logs are desired to be sawed up and a corresponding increased speed of the power plant is required for the operation of the reciprocating saw blade. On the pinion end of the drive shaft 4 is fixed a pinion 38 adapted to engage with a gear wheel 39 of larger diameter, according to the ratio of reduction, which is rigidly mounted on the lateral axial hub of a crank arm 40, which crank arm is journaled on a shaft 41, rigidly secured to the underside of the frame 1, at the rear end of one side member thereof. On the crank arm is fixed a wrist pin 42, adapted to receive one end of the pitman 32 journaled thereon, for the operation of the reciprocating saw blade 18, adapted to be connected thereto. The speed reducing gearing above referred to, may obviously be of any other analogous power transmitting structure, for instance, a chain engaging with sprocket wheels may be substituted therefor. This auxiliary gearing may be employed in conjunction with any of the various speeds of the vehicle transmission gearing according to the ratio of the auxiliary gearing, hence, in some instances, it may be desirable to employ the "direct drive" of the vehicle for the operation of the saw.

Although there has been shown on the drawing and described, a direct connection of the parts for reciprocating the saw by the crank arm, which obviously imparts a specific rocking motion to the same when in action, it is to be understood that any of the well known means used for reciprocating a saw to impart other rocking motions thereto, such as produced by the "eccentric type" having a reciprocating crosshead slidably mounted on rods may be employed, if so desired.

It will be understood that while I have illustrated and described my invention as applied to a motor vehicle having a transmission of the "planetary" type, other makes of vehicles embodying transmissions of the "sliding gear" type are equally applicable for employment of the invention. Also it is understood that the power plant and transmission gearing of the vehicle and the drag saw may be mounted in a stationary manner, if preferred, and I reserve the right to make such changes in the form, construction and arrangement of parts as will not depart from the spirit of the invention or the scope of the subjoined claims.

I claim:

1. In combination with a motor vehicle chassis having the usual power plant and transmission providing reverse and low-speed gearing, a drive shaft adapted to be connected at one end to said transmission and providing a crank on its opposite end, a reciprocating tool means provided for suitably connecting said tool to said crank for operation by the drive shaft and reversely operable means to start and stop, conveniently adjacent said crank for controlling transmission of speeds to said drive shaft, confined to alternatively operating the low or reverse speeds of said transmission when the same is directly driven by the reverse or low-speed gearing of said power plant.

2. In combination with a motor vehicle chassis having the usual power plant and transmission providing reverse and low-speed gearing, a drive shaft adapted to be connected at one end to said transmission, a speed reducing gearing having one engaging member thereof connected to the free portion of said drive shaft adapted to engage with a reduced speed gearing element providing a crank adapted to receive a reciprocating power element for operation by said crank, and reversely operable means to start and stop, conveniently adjacent said crank for controlling transmission of speeds to said drive shaft, confined to alternately operating the low or reverse speeds of said transmission.

3. In combination with a motor vehicle chassis having the usual power plant and transmission, providing the usual forward and reverse speed gearing, a drive shaft adapted to be connected at one end to said transmission, a speed reducing gearing having one engaging member thereof connected to the free portion of said drive shaft adapted to engage with a reduced speed gearing element providing a crank adapted to receive a reciprocating power element for operation by said crank, and reversely operable means to start and stop, conveniently adjacent said crank for controlling transmission of speeds to said drive shaft, confined to alternatively operating one forward or reverse speed of said transmission.

WALTER A. RARIG.